US008870320B2

(12) United States Patent
Müller et al.

(10) Patent No.: US 8,870,320 B2
(45) Date of Patent: Oct. 28, 2014

(54) METHOD AND APPARATUS FOR PROCESSING IMAGE DATA

(71) Applicant: Hewlett-Packard Development Company, L.P., Houston, TX (US)

(72) Inventors: Andreas Müller, Barcelona (ES); Utpal Kumar Sarkar, Sant Quirze del Valles (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/752,527

(22) Filed: Jan. 29, 2013

(65) Prior Publication Data

US 2014/0210888 A1     Jul. 31, 2014

(51) Int. Cl.
*B41J 29/38* (2006.01)
*H04N 1/46* (2006.01)
*B41J 2/13* (2006.01)

(52) U.S. Cl.
CPC ........................................ *B41J 2/13* (2013.01)
USPC ............................................. 347/9; 358/517

(58) Field of Classification Search
CPC ............... B41J 2/04526; B41J 2/04551; B41J 2/04558; B41J 2/04573
See application file for complete search history.

(56) References Cited

U.S. PATENT DOCUMENTS

| 6,164,745 | A  | * | 12/2000 | Nagoshi et al. ................. 347/15 |
| 6,788,432 | B1 |   | 9/2004  | Garcia et al. |
| 7,988,251 | B2 |   | 8/2011  | Dimitrijevic et al. |
| 8,287,072 | B2 |   | 10/2012 | Rueby et al. |
| 2010/0110131 | A1 | * | 5/2010 | Nashimoto ...................... 347/12 |
| 2011/0012985 | A1 |   | 1/2011  | Dyck et al. |

OTHER PUBLICATIONS

Kamasak, et al., "Dynamic Print Mode Control for Inkjet Printing," Retrieved from https://engineering.purdue.edu/~bouman/publications/pdf/nip01mustafa.pdf, Oct. 26, 2001, 5 pages.

\* cited by examiner

*Primary Examiner* — Matthew Luu
*Assistant Examiner* — Renee I Wilson

(57) ABSTRACT

A method and apparatus for processing image data is described. An example of a method involves applying a first mask to image data corresponding to an overlap zone of a first print region, the first mask representing a first mask pattern and applying a second mask to image data corresponding to the overlap zone of a second print region, the second mask representing a second mask pattern. Each of the first and second mask patterns define a periodic variation in a dimension corresponding to the first direction. First and second mask patterns for at least a second image plane are spatially separated in the dimension corresponding to the first direction in relation to first and second patterns of a first image plane.

20 Claims, 19 Drawing Sheets

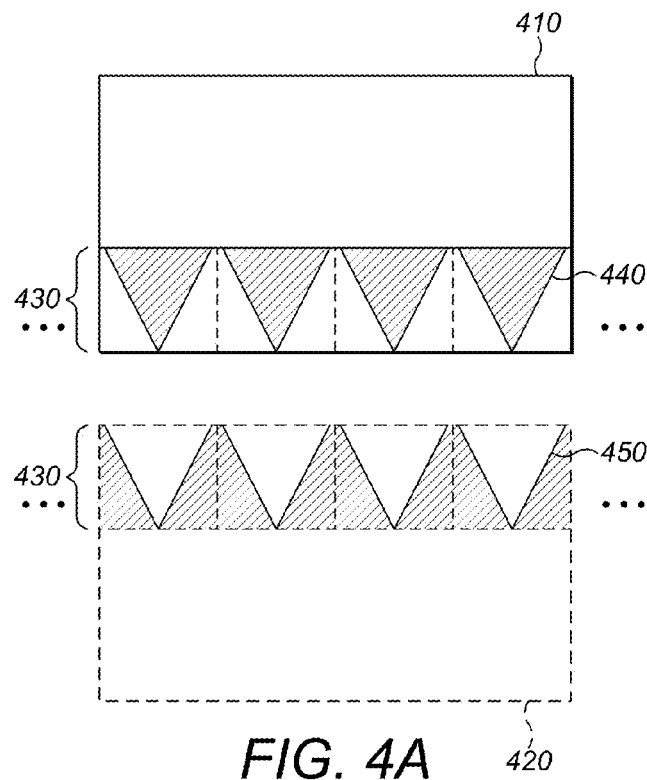
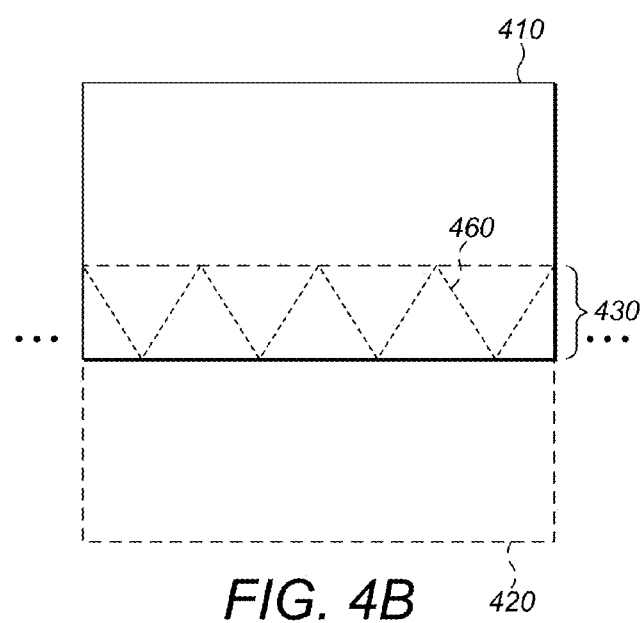

| 1 | 0 | 0 | 0 | 0 | 0 | 0 | 0 | 0 | 0 | 0 | 1 |
|---|---|---|---|---|---|---|---|---|---|---|---|
| 1 | 1 | 0 | 0 | 0 | 0 | 0 | 0 | 0 | 0 | 1 | 1 |
| 1 | 1 | 1 | 0 | 0 | 0 | 0 | 0 | 0 | 1 | 1 | 1 |
| 1 | 1 | 1 | 1 | 0 | 0 | 0 | 0 | 1 | 1 | 1 | 1 |
| 1 | 1 | 1 | 1 | 1 | 0 | 0 | 1 | 1 | 1 | 1 | 1 |
| 1 | 1 | 1 | 1 | 1 | 1 | 0 | 1 | 1 | 1 | 1 | 1 |

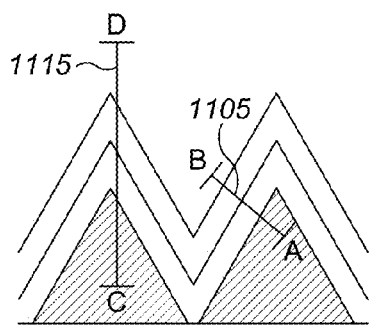
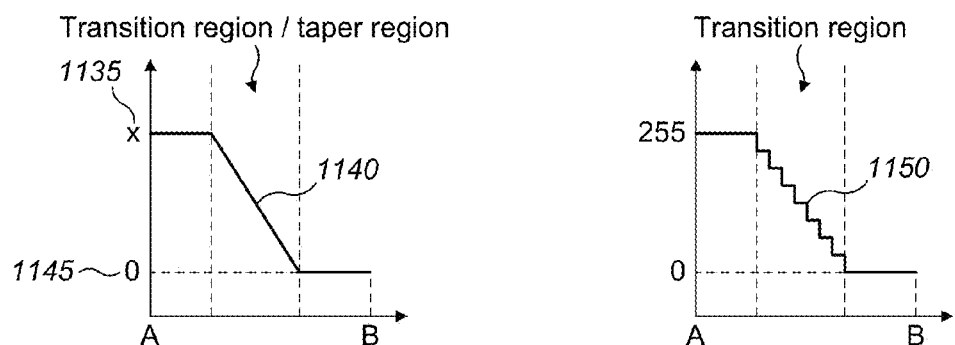
FIG. 11B

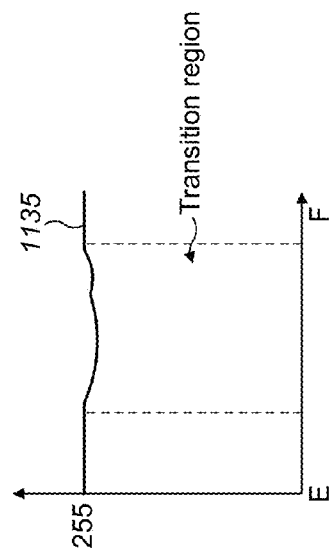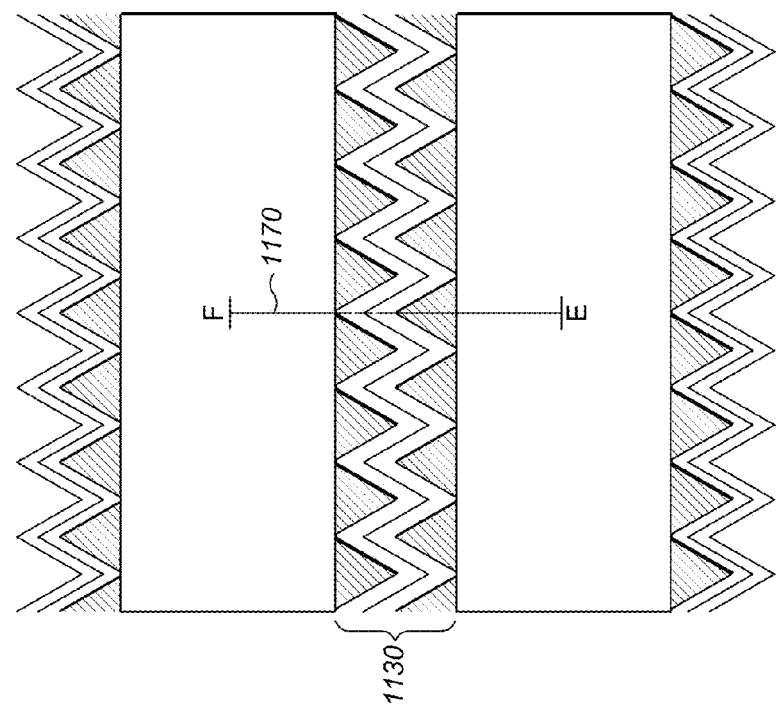
FIG. 11C

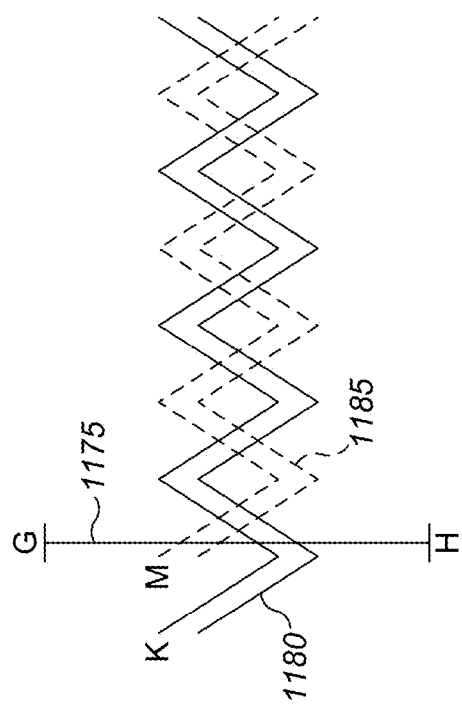
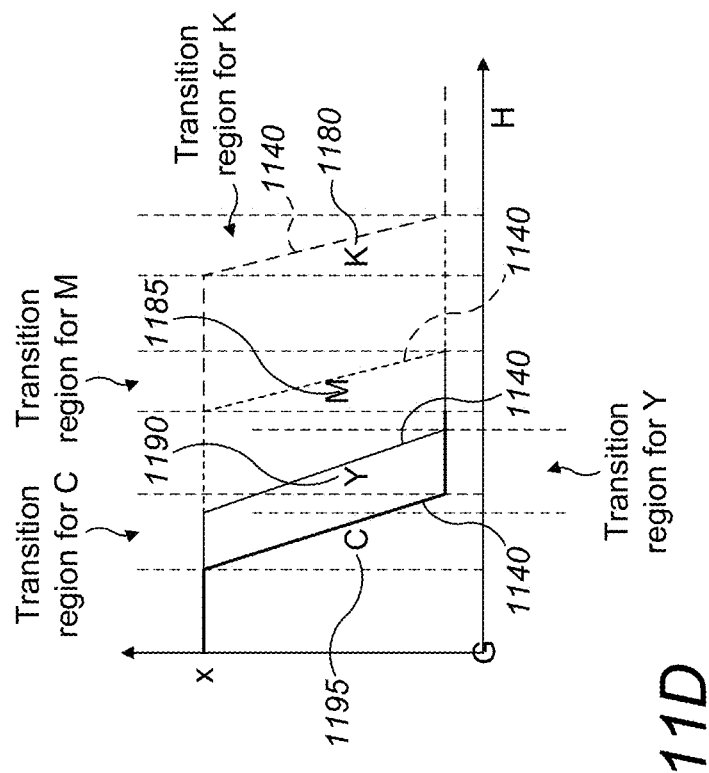
FIG. 11D

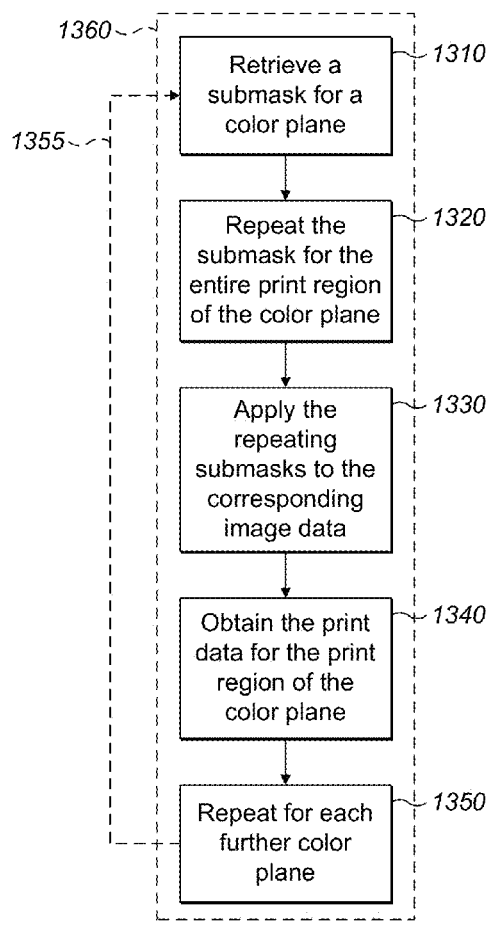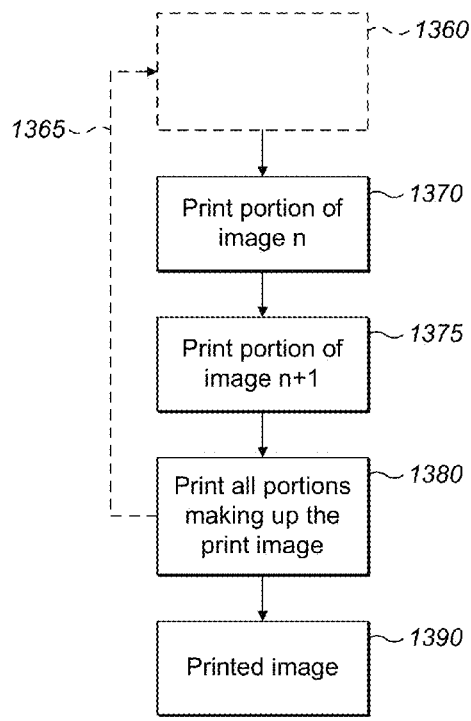
FIG. 13A
FIG. 13B

METHOD AND APPARATUS FOR PROCESSING IMAGE DATA

BACKGROUND

Printing devices such as inkjet printers may comprise one or more printheads for depositing ink onto a print medium. These printing devices may be used in a wide variety of applications, and may include computer printers, plotters, copiers, and facsimile machines. Often a printhead forms part of a removable printer pen or cartridge. Certain printing devices feature print modes in which a portion of an image is printed during one or more passes of a printhead. In each pass of the printhead, which moves relative to a print medium, a swath is printed. A swath may be defined as one or more lines of pixels along a scan axis of a printhead where an image or image portion may be printed by the deposition of ink drops by the nozzles in a passing printhead along the scan axis. High-throughput print modes may print a series of parallel swaths, or overprint multiple swaths, that when combined form the image. When producing a printed output with such printing devices, it is useful to maintain a high image and/or print quality.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 4A is a schematic illustration showing an example of adjacent swaths having a first and second complementary pattern for a first color plane.

FIG. 4B is a schematic illustration showing an example of a pattern defined by a triangular waveform at the border of adjacent swaths.

FIG. 11B is a schematic illustration that shows cross-sections through a generated gradated border that has varying pixel densities.

FIG. 11C is a schematic illustration that shows a cross-section through adjacent print regions having patterned borders with a gradated pixel density.

FIG. 11D is a schematic illustration that shows a cross-section across a patterned border for different color planes, wherein each color plane has a patterned border that results in a gradated pixel density.

FIG. 13A is a flow chart that shows a method for repeating a submask to generate a full-width mask.

FIG. 13B is a flow chart that shows a method for printing portions of an image.

DETAILED DESCRIPTION

In the following description, for purposes of explanation, numerous specific details are set forth in order to provide a thorough understanding of the present apparatus and method. It will be apparent, however, to one skilled in the art that the present apparatus and methods may be practiced without these specific details. Reference in the specification to "an example" or similar language means that a particular feature, structure, or characteristic described in connection with the example is included in at least that one example, but not necessarily in other examples.

The examples described herein are applicable for use with inkjet or other types of printers wherein one or more printheads are mounted to a carriage and adapted to move relative to a print medium.

In general, the term swath will be used throughout the description to describe an area of a print medium swept out by a passing printhead and the term print region will be used to describe a printed area of a swath that is printed by the passing printhead. For example, in certain cases a printhead may move relative to a print medium along a scan axis to sweep out a swath, and firing nozzles within the printhead may be arranged to deposit ink drops onto a print medium. The terms swath and print region may be used interchangeably throughout the description, however in general, reference made to a print region describes the printed area of a swath. The area of the print region may be less than or equal to the area of the swath. When reference is made to two or more print regions this may refer to areas of two or more swaths, or a part thereof, to be printed. Each swath extends along a scan axis, or "scanned" by a moveable carriage holding one or more printheads that moves across a width of a print medium or any axis along which the printhead moves relative to the print medium. A first and second direction of the print medium as used herein refer, for example, to dimensions that are perpendicular to one another and exist along the width and length of the print medium.

Certain examples described herein relate to imaging and printing that may be controlled with intra device software. Examples may be applied to high throughput print modes in which a portion of an image is printed during two or more passes of a printhead. For example, such printing may be used to produce outdoor billboards that have a very large viewing distance. Examples may apply to a variety of ink types including Latex or polymer-type inks that comprise a liquid ink vehicle that carries latex polymer and pigment particles to a surface of a print medium.

Figure 1A:
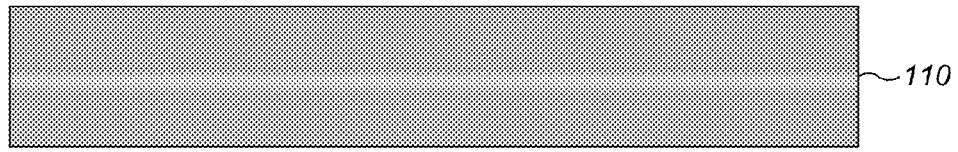
FIG. 1A is an illustration showing a comparative example of adjacent swaths with a banding artifact for an over-advance case.
Figure 1B:
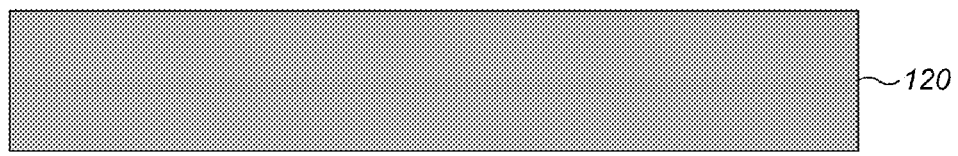
FIG. 1B is an illustration showing a comparative example of adjacent swaths with a banding artifact for an under-advance case.
Figure 1C:
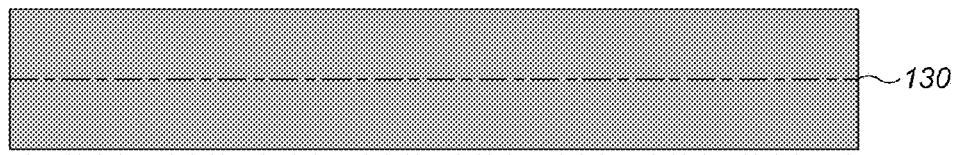
FIG. 1C is an illustration showing an example of adjacent swaths for an ideal case without a banding artifact.

In certain print systems, it may be desired to improve and/or maintain print quality. For example, certain printing systems may have an advance error between swaths that leads to print defects such as banding artifacts being visible in a printed image. These print defects may be unsightly and undesirable. This advance error is seen between adjacent swaths due to a media advance mechanism causing the print medium to advance more or less than a desired amount between the printhead printing a swath n and an adjacent swath n+1. For example, it may be desired that the printhead should print a first swath and then the print medium be advanced the width of one full swath for the printhead to print the second swath, however if the distance that the print medium advances in order for the printhead to print the second swath is more than the height of one swath, there will be a gap on the print medium between the first and second swaths. The consequence of an advance error may be a visible line between adjacent swaths in which either: there is a gap between the swaths in which not enough ink drops are deposited to completely fill the printed image, or a larger than desired number of ink drops are deposited for an under-advance case which produces a visible darker print line defect. Examples of an advance error are shown in FIG. 1A for an over-advance error 110, in FIG. 1B for an under-advance error 120. For comparison, an ideal case without any advance error 130 is shown in FIG. 1C. Banding artifacts may be more visible in high throughput print modes because a media advance and/or pen-fire frequency are generally working at their limits. In this case, media advance is defined as the rate at which the printhead and print medium are incrementally moved relative to each other in order to print the image.

Certain examples described herein image data is processed to reduce and/or avoid print artifacts such as banding. Print artifacts, such as banding, are reduced or avoided by applying a mask to an image to be printed. Certain examples use a mask that comprises a distinct vertical component that breaks up an otherwise regular, horizontal pattern produced on a printed output. A printed output generated by the application of such a mask reduces the visibility of any banding artifacts that may be generated, e.g. as viewed by a human observer.

Certain examples described herein, as well as transposing a horizontal interleave pattern in a non-horizontal direction, i.e. introducing variation in a scan axis direction, also enable a spatial separation of an advance error for different image planes along the scan axis. These methods are particularly effective with a pattern comprising a V-shape, i.e. a vector component at an angle of approximately 45 degrees, as this allows variation in both horizontal and vertical directions. In these cases, a different mask function may be applied for different image planes, such as different color planes, to spatially separate the advance error for different planes along a scan axis. This has an effect of reducing the visibility of print defects such as banding artifacts. It may be used, for example, for color prints or other printing operations wherein a separate image plane is printed by a respective printhead.

Figure 2:
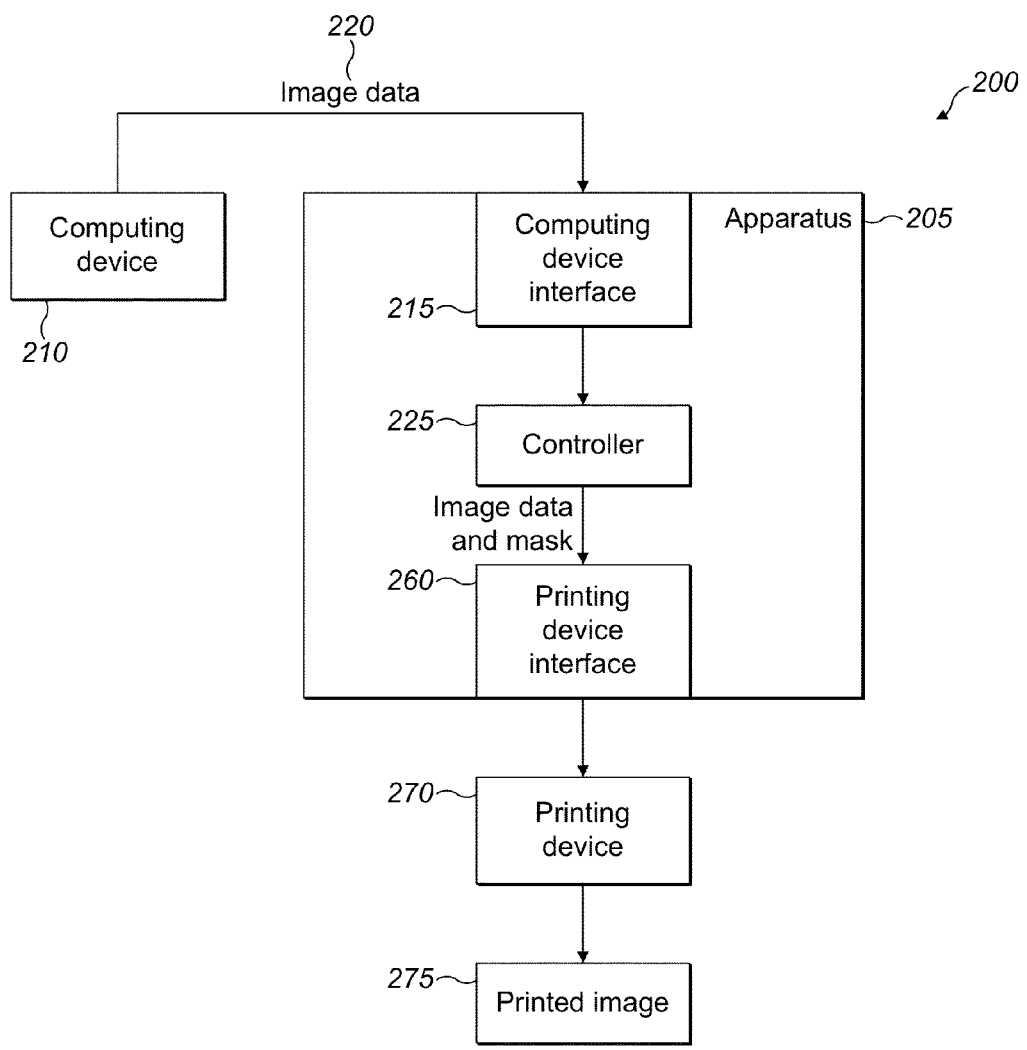
FIG. 2 is a schematic diagram showing an apparatus for processing image data according to an example.

FIG. 2 shows a portion of a printing system 200 according to an example. In FIG. 2, the printing system 200 comprises apparatus 205. The apparatus 205 comprises a computing device interface 215, a controller 225 and a printing device interface 260. The apparatus 205 receives image data 220 for use in an image processing operation via the computing device interface 215. The image data 220 represents an image to be processed. The image data 220 is received from a computing device 210 that is communicatively coupled to, or forms part of, the apparatus 205. The image to be processed is an image to be printed on a print medium by a printing device 270. In FIG. 2, the apparatus 205, via the controller 225, applies one or more mask functions to the image data. A mask function transforms the received image data according to a mask pattern and outputs print data that is used to control the firing of nozzles on one or more printheads. Once the one or more mask functions have been applied to the image data 220, print data is made available to the printing device interface 260, which is arranged to send the print data to the printing device 270 to print a portion of the image.

Figure 3A:
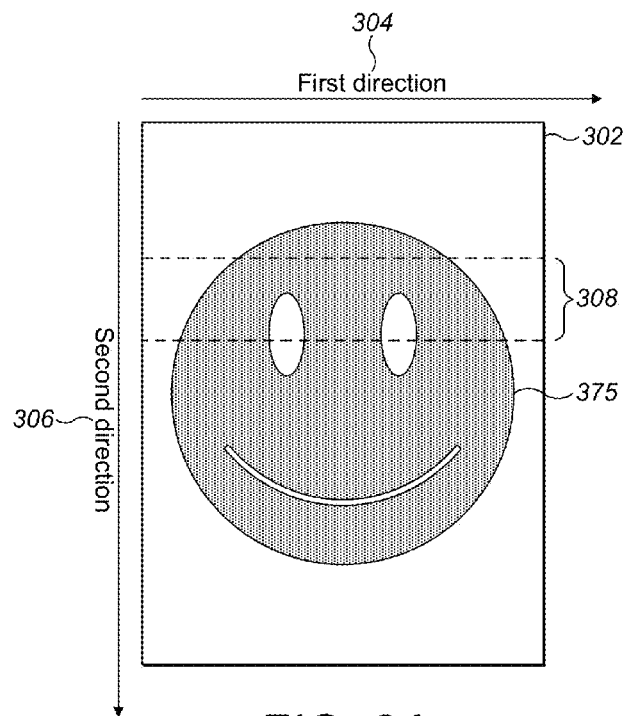
FIG. 3A is a schematic illustration that shows a portion of an example image to be printed with a defined first and second direction.

FIG. 3A shows a printed image, such as printed image 375, that is printed on a print medium 302 according to an example. An image to be printed may be one or more of a grayscale image, a binary image and a color image. Halftones may be used for grayscale images. A color image may use any known color scheme. For example, a color image may comprise more than one color plane. For grayscale images there may be one or more halftone planes that may be seen as equivalent to a color plane for a color image. An image may be composed of a plurality of image planes, of which a color plane is one example. Each image plane may be printed by a different printhead or printer pen installed in a printing device. In FIG. 3A, the printed image has a first direction 304 and a second direction 306. The first direction 304 extends along a width of the print medium. The second direction 306 extends along the length of the print medium 302 and is perpendicular to the first direction 304. The width of the print medium may be longer, shorter or equal to the length of the print medium.

Figure 3B:
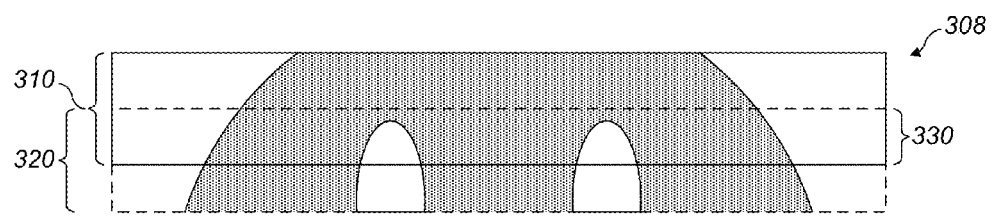
FIG. 3B is an illustration showing an example portion of a printed image that is divided between a first and second print region.
Figure 3C:
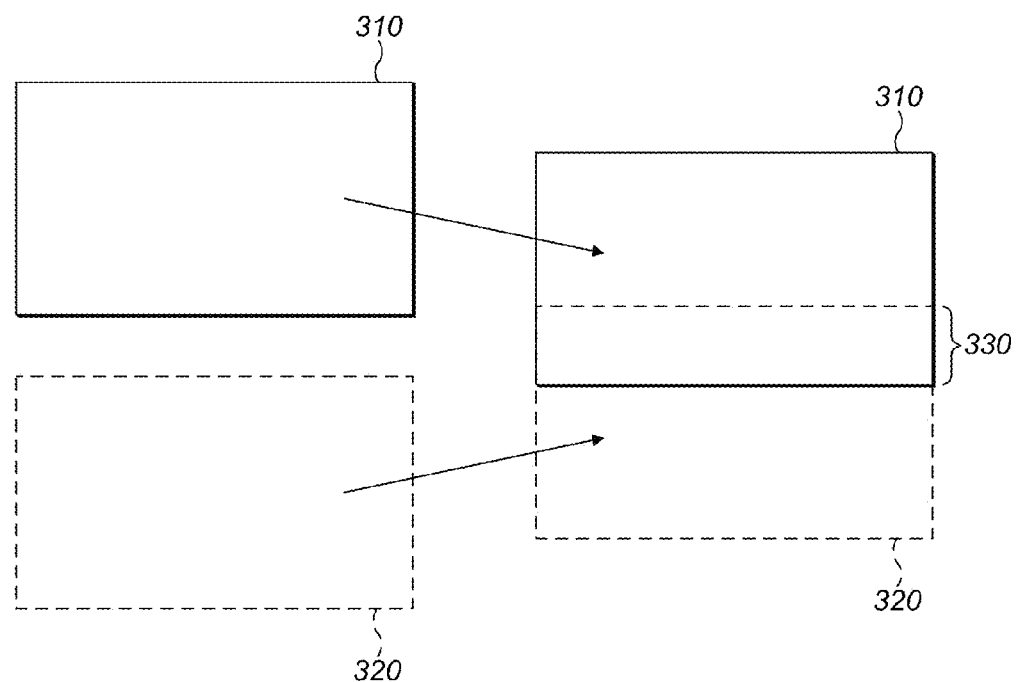
FIG. 3C is an illustration of an example first and second print region.

FIG. 3A shows a portion 308 of the printed image. Printing of the portion of the image is split between two swaths for a two-pass printing operation. In other examples a portion of an image may be printed with any number of a plurality of passes, FIGS. 3B and 3C show the portion 308 in more detail. In this example, the portion 308 comprises a first print region 310 and a second print region 320. The first print region 310 is printed during a first pass of a printhead and the second print region 320 is printed during a second pass of the printhead. Each pass of the printhead occurs along a scan axis. The second print region 320 overlaps the first print region 310 in an overlap zone 330 extending in the second direction 306. In the area of the overlap zone 330, image data corresponding to the first print region 310 is the same as image data corresponding to the second print region 320, i.e. there is image data that is common to adjacent swaths in the one or more overlap zones 330. In other examples, there may be one or more overlap zones 330 within a swath, for example there may be an overlap zone at the top and bottom borders of a swath. In other examples, the portion of the image to be printed may be split between more than two swaths, depending on the number of passes of a printhead needed to print the portion of the image i.e. three swaths for three-pass printing. In certain examples two or more passes may print each of regions 310 and 320 without movement in a media advance direction. Further portions of the image are incrementally printed to complete the full image 375.

FIG. 4A shows a first print region 410 that is adjacent to a second print region 420. The first and second print regions 410, 420 overlap in an overlap zone 430 of a printed image, which may correspond to a portion of an image to be printed such as 330 in FIG. 3B. The printed image in this case is shown as a solid block of one color or printing fluid. The first and second print regions 410, 420 may be similar to the first and second print regions shown in FIG. 3C. FIG. 4A shows the result of applying one or more masks to image data that corresponds to the overlap zone 430. This image data may have a component that is used to print the first print region 410 and a component that is used to print the second print region 420. The application of a mask to image data results in a first printed pattern 440 that forms part of the first print region 410 and a second printed pattern 450 that forms part of the second print region 420. The second printed pattern 450, which arises from the application of a mask to image data corresponding to a second swath, is complementary to the first printed pattern 440 obtained by applying a mask to image data corresponding to a first swath. A triangular waveform is visible in both printed patterns that extends in a first direction. FIG. 4B shows how the first and second printed patterns 440, 450 complement each other and, if there is no over- or under-advance, result in a seamless boundary 460 between the two printed regions. In other examples, there may be variation between the first and second patterns such that they are not complementary. In these cases, the first and second patterns are arranged such that a printed output in the overlap zone of the first and second print regions is perceptually equivalent to a printed region produced from a single pass of a printhead, e.g. that multi-pass printing of the overlap zone is not detectable by the human vision system.

Each of the first and second printed patterns 440, 450 is located at the periphery or edge of a respective one of the first and second print regions 410, 420 that together overlap in the overlap zone 430. Each of the first and second printed patterns 440, 450 may comprise a waveform that may be repeated along the width of a respective print region. Depending on the implementation a mask may be applied to all image data corresponding to a printed region or swath, or may be applied to a subset of said image data, for example image data corresponding to a printed output of each region in the overlap zone 430. The mask data 230 applied to a print region may comprise both the mask data to be applied to image data in the overlap zone, and the mask data to be applied to image data in the remaining area of the print region that falls outside any overlap zone. In certain cases the masks as described herein may be applied to other pre-existing masks, for example halftone masks in a printing pipeline.

Figures 5A, 5B:
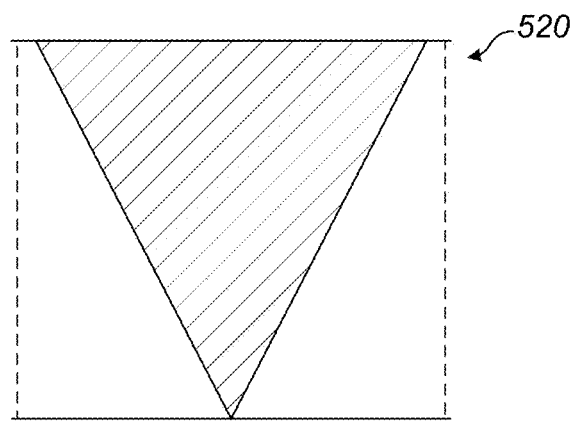
FIG. 5A is a schematic illustration showing an example of data defining a first submask.
FIG. 5B is a schematic illustration showing an example of a first subpattern present in the first submask.

FIG. 5A shows an example of data defining a first submask 510 according to an example. This may represent a mask function, e.g. FIG. 5A may correspond to the output of a mask function applied to a block of positive nozzle firing or image data. For ease of explanation a binary submask is used; however, practical implementations may be grayscale (e.g. comprise data in the range of 0-255) or color (e.g. have multiple channels). The first submask 510 may be repeated, as described later with reference to FIG. 5C. The first submask 510 is defined based on a first submask pattern 520, which is shown in FIG. 5B. The first submask 510 may be applied one or more times to image data representing pixels to be printed in an overlap zone, such as overlap zone 430. This then results in a printed pattern, such as first printed pattern 440 shown in FIG. 4. A submask may have the same dimensions as the image data to which it is applied, or may be of other dimensions and scaled accordingly. In the present example the shown portion of the submask corresponds to at least a portion of an interleave area between two swaths. Depending on the implementation, the submask may comprise other portions that correspond to other portions of a swath.

In FIG. 5A, the submask 510 is represented by individual mask values 530. As a binary mask is shown each mask value is either 0 or 1. In this case, a mask value of 1 (e.g. 530A) indicates that a corresponding pixel of image data should be printed, e.g. if the image data is binary and has a value of 1 in a corresponding pixel, a print nozzle in the printhead will fire an ink drop onto the print medium at the determined pixel location. A mask value of 0 (e.g. 530B) indicates a corresponding pixel of image data should not be printed, e.g. if the image data is binary and has a value of 0 in a corresponding pixel, a firing signal will not be sent to a nozzle in the printhead so that the nozzle does not fire at the chosen pixel location. In a non-binary case, a mask value may represent a modulation of a corresponding pixel value in the image data (e.g. a value of 127 may represent a scaling of an original pixel value by 50%).

In one example an image may be decomposed into swaths, i.e. overlapping strips whose height coincides with height of a printer pen or printhead. In this case a printhead "height" corresponds to the distance extended by a plurality of nozzles in a media advance direction. In this case there will be image data, which in some cases is referred to as a nozzle mask (although this definition will not be used herein for clarity), that defines the print fluid drops that have to be printed by every printer pen or printhead. In these cases there will exist overlap zones, such as 430 in FIG. 4A, where the same print fluid drops are laid down by the bottom of the printer pen or printhead in one pass and the top of the same printer pen or printhead in a later pass. Here a submask such as 510, when extended across the width of the swath, determines whether a pixel in the overlap zone should be printed in the first pass or the later pass, e.g. a mask value of 1 for an upper swath and a complementary mask value of 0 for a lower swath means that a pixel is to be printed in the first pass. The application of a mask or mask function results in printed portions that are adjacent to each other following both passes. In examples where two or more passes are used to print each print region without movement in a media advance direction, a submask such as 510 may be split so it can be selectively applied to an appropriate pass. For example, even columns of the submask may be applied as part of a mask function applied to data for a first pass and odd columns of the submask may be applied as part of a mask function applied to data for a second pass.

As described above, the representative mask values 530 of the submask 510 control the printed pattern that is to be formed on the print medium 302. In turn, the printed pattern that is formed on the print medium is defined by the submask pattern 520. As also described this may be implemented by data representing the submask or a mask function. In the example of FIG. 5B, a V-shaped or triangular submask pattern 520 is shown, wherein the 'V' has a height in a second direction and a width in a first direction. The application of the submask 510 to image data, such as image data 220, results in a plurality of individual print data values that are used to produce a printed output. A printed output may be produced in real-time or near-real time following the application of the submask or resulting print data may be used after a delay. The submask pattern 520 may take any shape with variation in the first and second directions. In cases where the submask 510 is to be repeatedly applied in a first direction, the submask pattern, and resulting submask values, need to allow for the seamless repetition of the submask 510 in order to form a repeating wave function. In certain cases, the degree of overlap between the first and second print regions in an overlap zone in the second direction determines the amplitude of the waveform present in a submask pattern.

Figure 5C:
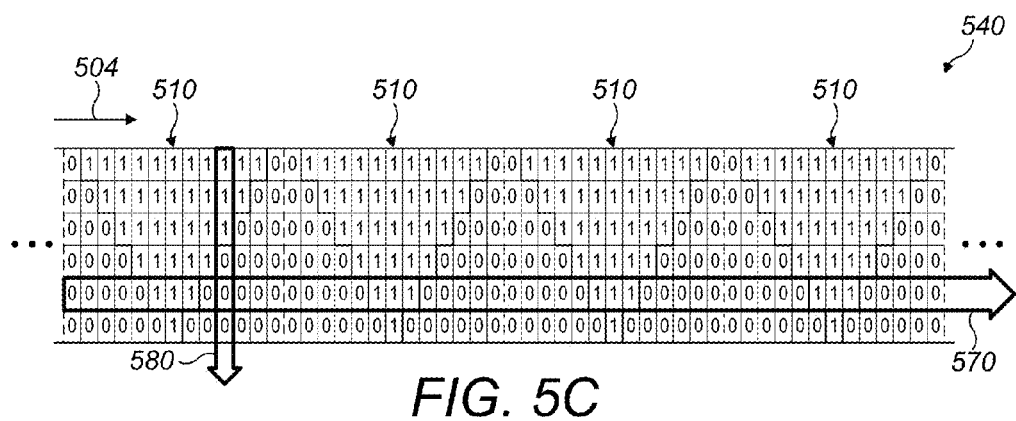
FIG. 5C is a schematic illustration showing an example of data defining a first mask.
Figure 5D:
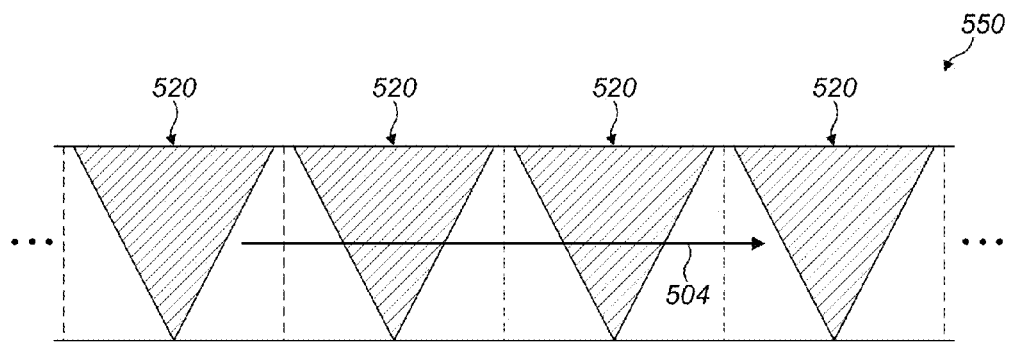
FIG. 5D is a schematic illustration showing an example of a first pattern present in the first mask.

FIG. 5C shows an example of data defining a first mask 540 that is formed by repeating the first submask 510 in the first direction. The first mask is defined by a first pattern 550 that comprises a repeated version of the first subpattern 520 in the first direction 504, as shown in FIG. 5D. As shown in FIG. 5C, mask values of the first mask 540 vary periodically in a first dimension 570 that is parallel with the first direction, for example in FIG. 5C they vary from 0→1→0 and so on when viewed along dimension 570. In contrast, mask values of the first mask 540 represent a step function in a second dimension 580 that is parallel with the second direction, e.g. the values vary from 1→0 in FIG. 5C. In implementations where a masking function is used, FIG. 5C may represent the output of the function when positive image data (e.g. all pixels to be printed) is applied.

Figures 6A, 6B:
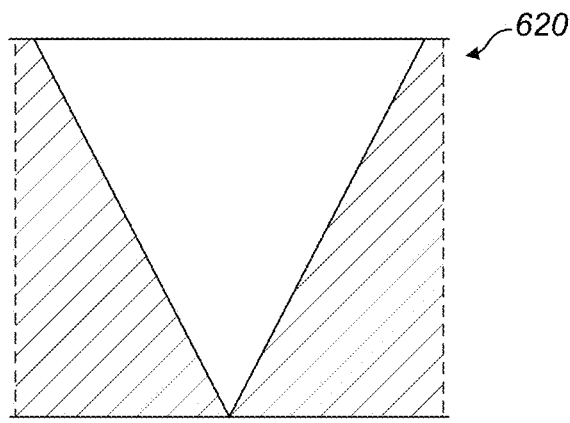
FIG. 6A is a schematic illustration showing an example of data defining a second submask that is complementary to the first submask of FIG. 5A.
FIG. 6B is a schematic illustration showing an example of a second subpattern present in the second submask that is complementary to the first subpattern of FIG. 5B.
Figure 6C:
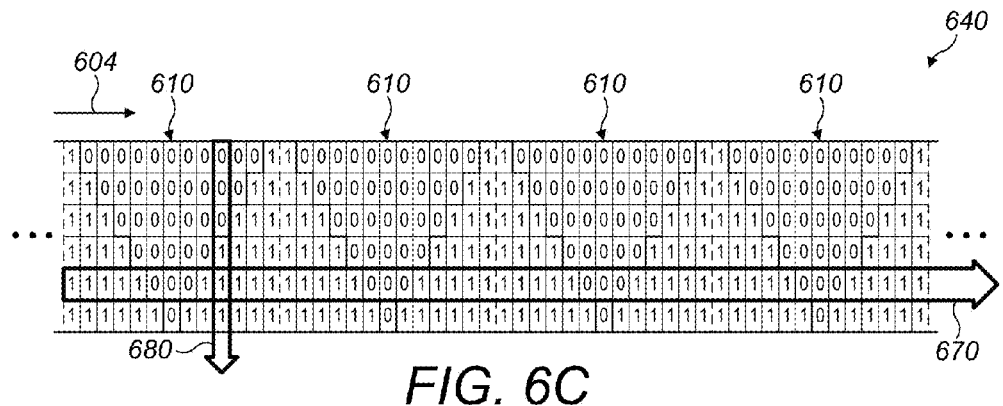
FIG. 6C is a schematic illustration showing an example of data defining a second mask that is complementary to the first mask of FIG. 5C.
Figure 6D:
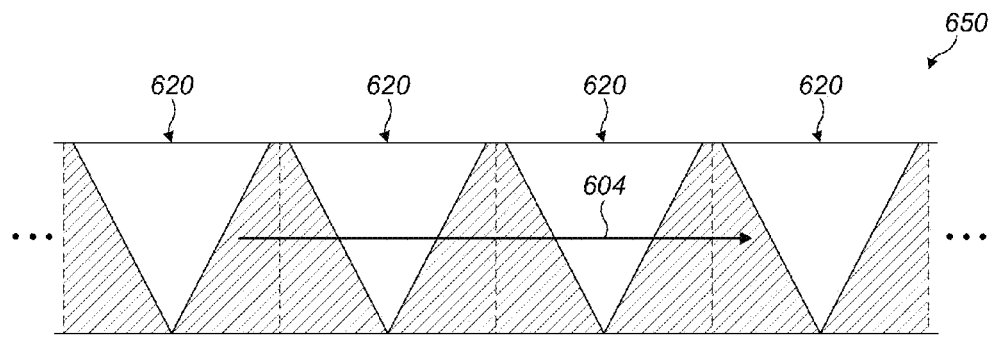
FIG. 6D is a schematic illustration showing an example of a second pattern present in the second mask that is complementary to the first pattern of FIG. 5D.

FIGS. 6A to 6D show a second submask and mask that are complementary to the example shown in FIGS. 5A to 5D. FIGS. 6A and 6B show an example of a complementary second submask 610 that has a second submask pattern 620. The second submask 610 is complementary to the first submask 510 of FIG. 5A, as the combination of the two submasks represents a case wherein all corresponding pixel values in the image data are printed. In other words, the second submask pattern 620 is the inverse of the first submask pattern. Similarly, FIGS. 6C and 6D are examples of a second mask 640 and second mask pattern 650 that complement the first mask 540 and the first mask pattern 550 of FIGS. 5C and 5D respectively. Like the first mask 540 of FIG. 5C, mask values of the second mask 640 vary periodically in a first dimension 670 that is parallel with the first direction. Mask values of the second mask 640 also represent a step function in a second dimension 680 that is parallel with the second direction, e.g. the values vary from 0→1 in FIG. 6C.

Figure 7A:
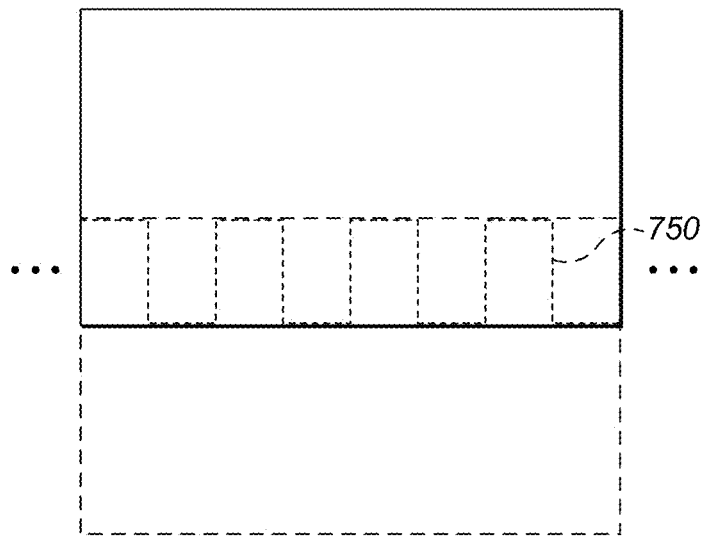
FIG. 7A is a schematic illustration showing an example of a pattern defined by a square waveform at the border of adjacent swaths.
Figure 7B:
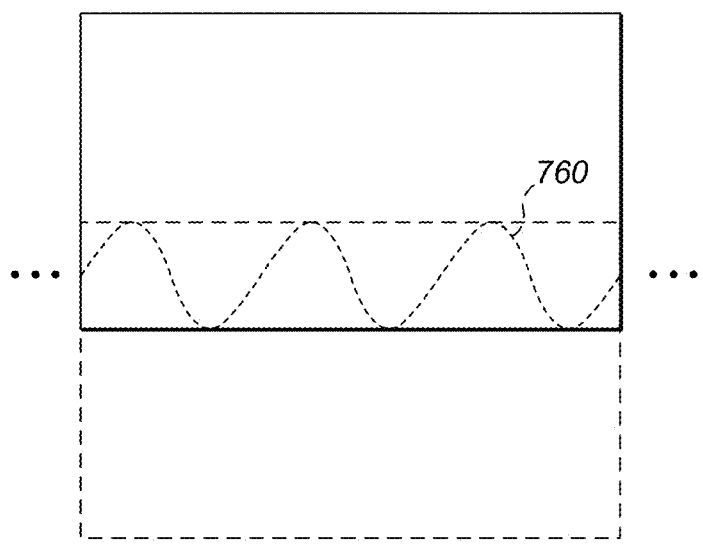
FIG. 7B is a schematic illustration showing an example of a pattern defined by a sinusoidal waveform at the border of adjacent swaths.

FIGS. 7A and 7B show examples of patterns that may alternatively be used to define a first and second mask, e.g. alternative patterns to the triangular waveform present in the first and second masks of FIGS. 5D and 6D. FIG. 7A shows a square waveform 750 that is formed by a mask pattern that has a square-wave profile. FIG. 7B shows a sinusoidal waveform 760 that is formed by a mask pattern that has a sinusoidal-wave profile. In these cases, first and second mask patterns comprise complementary patterns based on these profiles.

For a mask pattern with a repeating waveform, a submask pattern may comprise one periodic cycle of the repeating waveform. Other waveforms that vary along a first and second dimension parallel to the first and second directions 304, 306 of FIG. 3A may also be used.

A variation of the above example will now be described for color printing that uses image data comprising two or more color planes or dimensions (e.g. RGB: Red, Green, Blue or CMYK: Cyan, Magenta, Yellow and BlacK (or Key) and its variants such as CMYKLcLm including light cyan and magenta (Lc and Lm)). In other implementations the methods of this variation may be extended to any image composed of a plurality of image planes, for example cases where different image planes are to be printed with different printer pens or printheads. In the present variation, a spatial separation of different image planes is presented. This may be achieved by applying different masks or mask functions that are defined by a phase shift to a mask pattern for one or more image planes. Any resulting printed patterns at the borders of a print region for each image plane are then offset from one another in a first direction, such that a printed pattern for each image plane does not directly overlap a printed pattern for another image plane, e.g. printed patterns for each color of a plurality of colors will not fall in exactly the same location on the print medium.

Figure 8A:
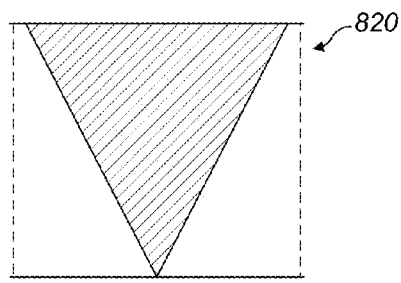
FIG. 8A is a schematic illustration showing an example of a first subpattern with a zero phase shift.

FIGS. 8A to 8D are representative of four different masking functions that are applied to four different colors in an example CMYK system. In the present case each masking function results in the application of a phase shift along a scan axis or first direction. For example each of FIGS. 8A to 8D are representative of submask patterns that result from particular masking functions, with the same function and pattern being applied along a swath for a particular color plane. A first submask pattern 820 is shown in FIG. 8A. This submask pattern 820 corresponds to a first color to be printed. In the present example, the different masking functions represent different phase shifts that are applied to the first submask pattern 820 to define submask patterns for further colors. For example, the controller 225 of FIG. 2 may be adapted to independently select an appropriate masking function that implements an appropriate mask for a particular color plane. Different interleave methods may also be independently applied to different image planes.

In FIG. 8A, the first submask pattern 820 has a zero phase shift. Applying a $\pi/2$ (90° degrees) phase shift to this submask pattern results in the second submask pattern 830 shown in FIG. 8B, where the second submask pattern appears to have traveled a quarter of a wavelength in the positive first direction 804. Similarly, applying a phase shift of $\pi$ (180° degrees) to the first submask pattern mask 820 results in a third submask pattern 840 shown in FIG. 8C, where the third submask pattern appears to have traveled half a wavelength along the positive first direction 804. Finally, FIG. 8D shows a $3\pi/2$ (270° degrees) phase shift applied to the first submask pattern 820 to generate a fourth submask pattern 850, where the resulting submask pattern appears to have traveled along the first direction 804 by three-quarters of a wavelength. The phase shift values set out herein are used for examples and actual values may vary in practice. A phase shift or offset for a particular color need not equal a phase shift or offset for another color. The submask patterns of FIGS. 8A to 8D may be used to define respective submasks and masks in a similar manner to FIGS. 5A to 5D.

The multiples of the quarter-wave phase shifts shown as examples in FIGS. 8A-D are for ease of explanation. Other methods that offset mask patterns for different colors across a width of a swath may alternatively be used as appropriate.

When a mask pattern is shifted along the first direction by a different amount for each color, any resultant printed patterns generated by over- or under-advance, are harder to distinguish and are less visible to the human eye. As such shifted patterns of each color relative to the colors in other color planes serve to further reduce the visibility of a banding artifact. In practice, the phase shift shown in FIGS. 8A to 8D may be implemented by masking functions that use different offsets. The masking functions may represent variations of a common function, e.g. a function that takes an offset as a parameter, or separate functions that implement the offset. Implementations may also randomly assigned an offset.

Figure 8B:
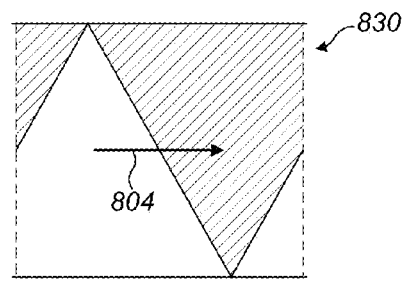
FIG. 8B is a schematic illustration showing an example of the first subpattern with a quarter-wave phase shift along a first direction.
Figure 8C:
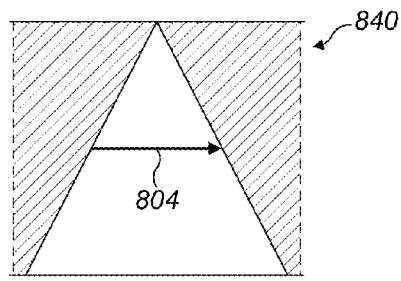
FIG. 8C is a schematic illustration showing an example of the first subpattern with a half-wave phase shift along the first direction.
Figure 8D:
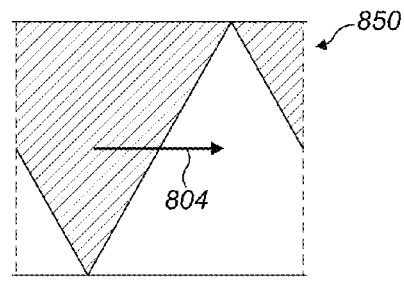
FIG. 8D is a schematic illustration showing an example of the first subpattern with a three-quarter-wave phase shift along the first direction.
Figure 9A:
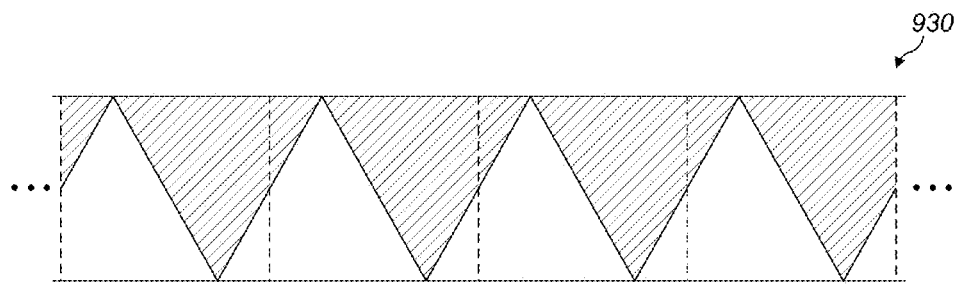
FIG. 9A is a schematic illustration showing an example of a first pattern for a second color to be printed.
Figure 9B:
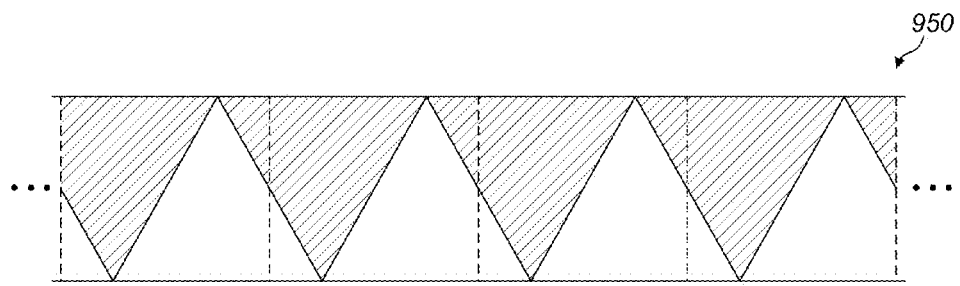
FIG. 9B is a schematic illustration showing an example of a first pattern for a third color to be printed.

FIG. 9A shows an example of a first printed pattern 930 for a second image plane, for example a printed pattern resulting from an application of the mask function represented in FIG. 8B to a solid block of color. A second printed pattern for the second image plane may be generated that is complementary to the first printed pattern for the second image plane, for example in a similar manner to that described for the second mask pattern 650 shown in FIG. 6D. FIG. 9B shows an example of a printed pattern 950 for a third image plane to be printed which represents a further phase shift to the first pattern of a first image plane. A complementary second printed pattern for the third image plane may also be accordingly generated.

Figure 10:
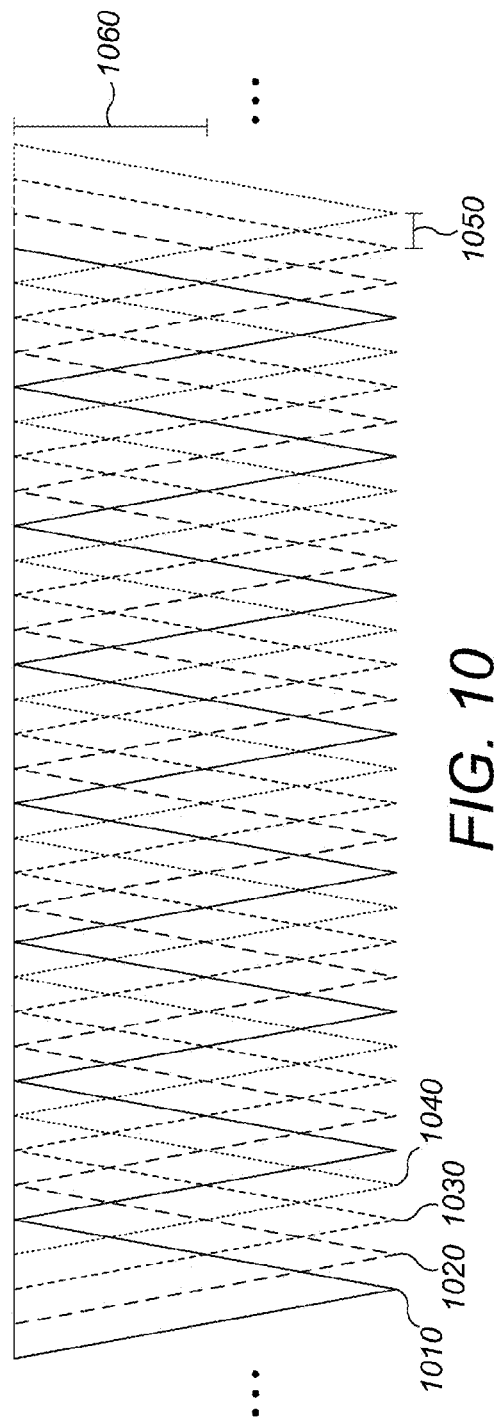
FIG. 10 is a schematic illustration that shows a spatial separation of each color plane along the first direction.

In certain examples, for a plurality of image planes to be spatially separated from one another, masks or mask functions are selected such that a representative phase shift or offset results in waveforms or mask patterns for each image plane that do not overlap and are not in phase with any other image plane. An example of this is shown in FIG. 10, where the patterns of four different colors 1010, 1020, 1030, 1040 (such as for CMYK image data) are offset 1050 from one another along a first direction. Due to the patterns having both a nonzero vertical and horizontal component with respect to first and second directions, a phase-shifted mask pattern for each color spatially separates a resulting printed pattern for each of the color planes along the first direction. The triangular waveform shown in FIG. 10 is the result of a 'V-shaped' submask pattern in which each submask pattern has a vector component at a non-zero angle to the first direction and a vector component at a non-zero angle to the second direction. In addition, there is an element of spatial separation 1060 for each color that depends upon the nonzero vertical and horizontal components of the patterns and the height of the overlap zone.

In another variation of the examples discussed, each mask applied to image data may result in a different pattern for respective colors. In this case, an explicit phase shift may not be required. For example, a first mask for a first color may be defined based on a triangular mask pattern and a second mask for a further color may be defined based on one of a square or sinusoidal waveform, provided that the patterns of adjacent swaths complement each other.

Figure 11A:
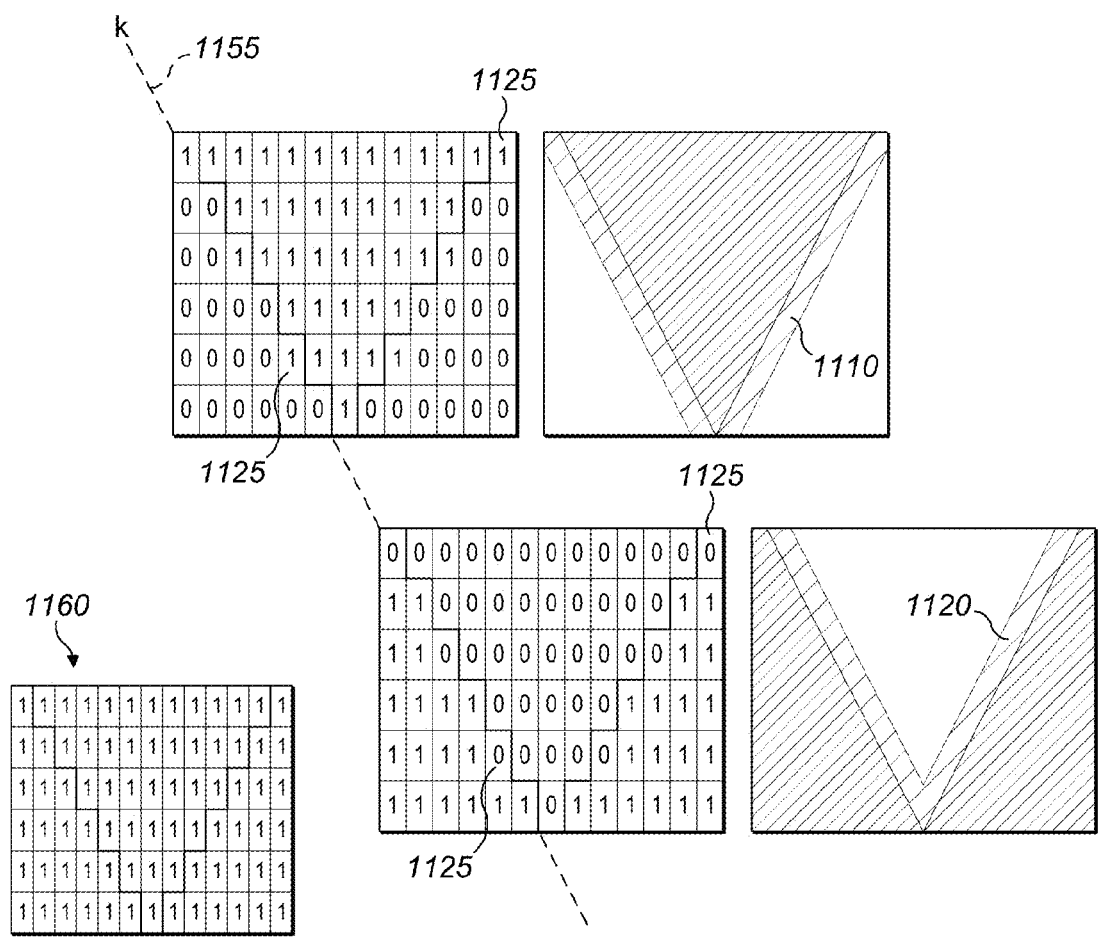
FIG. 11A is a schematic illustration showing an example of mask data for use in obtaining a gradated border in a print region.

A variation of any one of the above described examples is shown in FIG. 11A. In the variation, a mask or mask function is arranged such that a border of printable matter in a print region or swath is gradated. FIG. 11A shows a first printed pattern 1110, as may be generated when the image data comprises solid color, where the edge of a solid color region fades gradually to white, e.g. a print medium color. Likewise, a second printed pattern 1120 has an unprinted region that gradually changes to a block of solid color, wherein the transition from a solid color to an unprinted region in the second printed pattern 1120 complements the transition from a solid color to an unprinted region in the first printed pattern 1120.

The gradated border shown in the first and second printed patterns may be implemented by applying a taper or gradient to the mask at the border of two mask regions. For example, in FIG. 11A, a gradated border of two mask regions within a submask is perpendicular to an edge of a submask pattern. In FIG. 11A, such a border is arranged perpendicular to k 1155. In FIG. 11A, values 1125 in the first and second submasks complement one another at the gradated borders, such that, in this binary case, combined adjacent mask values produce a mask value of unity as shown at 1160. This means that all ink for a particular image pixel value will be deposited once two passes of the printhead have been completed. The tapered edge of the submask pattern helps to further break up the recognisability and visibility of a banding artifact, especially one due to an advance error. In other practical examples, grayscale masks or the like may have a gradated border implemented by the presence of mask values between a maximum and minimum mask value (e.g. between 255 and 0). As described previously, a gradated border may also be generated by a masking function that implements the arrangements shown in FIG. 11A.

FIG. 11B shows different cross-sections through the border of a printed pattern having a gradated border, where one cross-section (AB) 1105 is perpendicular to the border and the other cross-section (CD) 1115 is along a second direction. In this example, the pixel density across the gradated border varies between a first level 1135 and second level 1145 for each cross section. Examples of how the pixel density varies in a transition or taper region 1140, 1150 are shown in FIG. 11B for each cross section. In FIG. 11B, two transitions are shown: a gradual and smooth transition 1140 and a stepped transition 1150. Other variations of the pixel density between two levels may be described by other functions.

FIG. 11C shows two adjacent print regions following a print operation. Both print regions were deposited with a gradated border. As shown in FIG. 11C the pixel density along a cross section (EF) 1170 for an overlap zone in the second direction is substantially uniform 1135. Even if there are over- or under-advance errors, print defects will not be easily recognisable or visible. For example, gradients such as the transitions 1140, 1150 across adjacent borders 1110, 1120 help to merge the two print regions to minimise an obvious appearance of advance error defects.

FIG. 11D illustrates how a tapered border may be applied to image data for different image planes that are spatially separated from each other according to an example with different color planes. In FIG. 11D, a printed pattern for each color plane is spatially separated from printed patterns for other colors in a color set along cross section (GH) 1175 in a second direction, such as second direction 306 shown in FIG. 3A. The cross section (GH) 1175 passes through a transition region of the print region borders for each of the color planes. In the example of FIG. 11D, a printed pattern for a first color 1180 and a printed pattern for a second color 1185 (e.g. K and M) are shown to have borders that are offset from one another along a first direction, such as first direction 304 in FIG. 3A. The pixel density or pixel intensity along the second direction may vary according to examples discussed above with reference to FIG. 11B. FIG. 11D shows that a transition region 1140, 1150 for each color plane (C, Y, M, K) does not generally fall within a same zone or area as other color planes. For example, the transition region 1140 for two printed patterns of colors K 1180 and M 1185 do not overlap with each other or another color. Transition regions may overlap though and this is shown in FIG. 11D wherein the transition region 1140 for a third color C 1195 and a fourth color Y 1190 overlap one another to a degree. In certain examples, a magnitude of the phase shift of each further color with respect to a first color determines the degree of overlap of the transition region 1140 of a printed pattern for each color plane. In other examples, there may be a zero or non-zero degree of overlap between the transition regions 1140 of differing color panes. The transition region falls within the overlap zone.

A number of methods of processing image data will now be described. These methods may be implemented on apparatus 205 as shown in FIG. 2 or on other apparatus.

Figure 12:
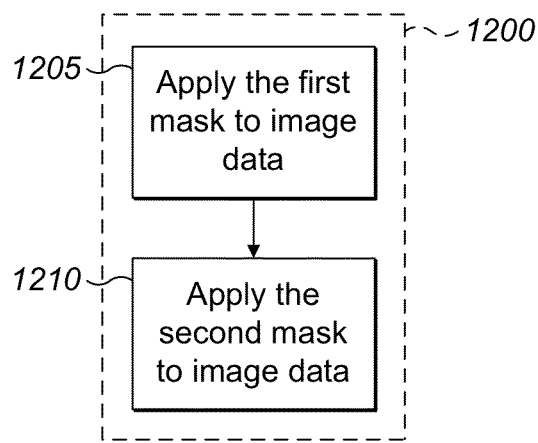
FIG. 12 is a flow chart that shows a method for processing image data according to an example.

FIG. 12 shows a method 1200 for processing image data according to an example. The method 1200 is applied for a first print region deposited during a first pass, i.e. corresponding to a first swath, and a second print region deposited during a second pass, i.e. corresponding to a second swath. The method 1200 will be described for a particular color to be printed, but may be appropriately applied to two or more colors or image planes to be printed with respective printheads. The method may be implemented by the controller 225 of FIG. 2. At block 1205 a first mask is applied to image data for the first print region for the color. The first mask is applied to at least image data corresponding to the overlap zone of the first print region. At block 1210, the second mask is applied to at least image data corresponding to the overlap zone of the second print region. Masks may be applied by applying a masking function or other operations designed to control the firing of particular nozzles in a printhead. In certain cases, the image data corresponding to the overlap zone of each print region may be the same.

In certain cases, the first mask may be applied to image data corresponding to a top border of all swaths and the second mask may be applied to image data corresponding to a bottom of all swaths to obtain complementary patterns at adjacent borders. In other cases, the first and second masks may be applied to image data corresponding to a respective top border and bottom border of each individual swath. The first and second masks may not be applied to both borders of a swath for the first and last swaths in the series of swaths making up the image (i.e. the first and last swaths being the beginning and end swaths at the uppermost and bottommost scan axes of the print medium). Any combination of one or more masks may be applied to image data in overlap zones provided that the resulting pattern of adjacent swaths or print regions are complementary.

FIG. 13A shows a method for repeating a submask for application to image data in a print region, to obtain a set of print data for each color to be printed. In this example, a submask for a color plane is retrieved by a controller, such as controller 225, at block 1310. In this example, the size of the submask data does not equal the size of the image data for the overlap zone of the print region. In this case, at block 1320, the submask is repeated for the part of the print region that the mask will be applied to. The resulting mask data is then applied at block 1330 to the image data describing the overlap zone of the print region. The print data is available once the mask data has been successfully applied to the image data at block 1340. For further colors, the process may be repeated for each color plane as shown by block 1350.

In certain examples, once print data for an overlap zone of each print region has been generated it is added to print data for areas of the print region that do not form part of the overlap zone. The print data (including the masked image data that has been processed) for each print region is then available for printing. In the case of the example of FIG. 2, the resulting print data is sent to the printing device interface 260 and the image is printed by the printing device 270. In other examples, instead of the print data being obtained for each color plane in turn as described above, the submask for each color plane may be obtained and repeated to produce mask data for each color plane without being applied to the image data. In these examples, once the mask data for each color plane has been obtained, the mask data is applied to the image data for each color. Yet in further examples, the submask may be applied to image data and repeated for the area of the overlap zone for each print region before being added to the remaining print data for the print region not residing within an overlap zone. In certain cases, the mask data may be applied to the image data either at the time when the image data is processed, or downstream after the image data has been processed and in this case the mask data is applied to processed image data. Print data may be stored in a memory for use in printing the image at a later time.

Another example of applying a mask will now be described. In certain examples, which may be implemented independently of the method of FIG. 13A described above, a printing operation first comprises generating an initial mask that determines which part of an image is to be printed in a particular pass. For example, in one case with two passes it may be determined to print all even columns in a first pass and all odd columns in a second pass. More generally, in P passes of a moveable carriage, on average one out of P initial mask entries for a pass has a value of 1, while entries for other passes have a value of 0. In other examples there may be more than two values. In one example, the height of the initial mask may be equal to the height of a swath (e.g. a printer pen or printhead) minus a portion equal to an overlap zone. In this example the top part of this initial mask having a height equal to the height of the overlap zone is replicated on the bottom of the initial mask. After this operation an interleave mask, which may comprise masks such as 540 and 640 in FIGS. 5C and 6C, is applied to the initial mask to generate a composite mask. This composite mask results in an average print density in each of the overlap zones of abutting and adjacent swaths equal to 0.5, e.g. such that the application of a composite mask for both overlap zones gives a print density of 1. As shown above even though an average density may be 0.5, it is produced in an inhomogeneous way, for example following the repeating V-shape described herein. Once the composite mask is generated, the appropriate part of a halftoned input image for each swath may be extracted and masked. This final masked image is sent as print data to print electronics that drive nozzle firing in one or more printer pens or printheads.

FIG. 13B shows a method for printing an image where the image is incrementally printed in swaths as a printhead advances relative to a print medium. In this example, a portion of an image is printed in two swaths or two passes of the printhead: at block 1370 a first print region is printed in swath n during a first pass of the printhead; and at block 1375 the second print region is printed in swath n+1 during a second pass of the printhead. At block 1380, multiple portions of the image are printed in this way until the whole image is printed at block 1390. The first swath n may have only one overlap zone shared with the second swath n+1. The second swath n+1 may have two overlap zones, one shared with the swath n and another shared with the swath n+2. The following swaths may also have two overlap zones shared with adjacent swaths up to the last swath to be printed which, like the first swath n may only have one overlap zone shared with the previous swath and no further swaths.

The methods described in certain examples herein utilise interleaving to hide print defects such as banding artifacts that result, for example, from an advance error of a media advance system. The interleaving of the said examples provides a method which splits the printing of a lower section of a portion of an image between the lower part of the printhead in a print region n, and the upper part of the printhead in an adjacent print region n+1. A mask is then used to define how a portion of an image is to be printed between two or more print regions, wherein the two or more print regions are printed during two or more passes of a printhead moving relative to a print medium. Certain mask structures described herein, when applied to image data, result in print data and a printed pattern having a non-zero vertical component along an axis for each print region.

In particular examples, certain described masks effectively hide advance banding artifacts for print modes with high throughput and large viewing distance by spatially separating the advance error along a scan axis for different image planes, in certain cases maximising this spatial separation. These masks transpose a 'horizontal' pattern to one with a 'vertical' shape or component. In this case, dot placement error helps hide the pattern. For example, dot placement error is more likely to occur along a scan axis; as such unprinted areas with a vertical component have an amount of ink coverage due to dot placement error.

Certain described masks also give printed patterns with a vertical component that enable the decoupling of banding patterns of different image planes. As a result, banding patterns for each image plane, e.g. each colorant, appear spatially separated from each other which is difficult to achieve with a horizontal interleave pattern. The spatial separation is achieved by applying a different mask function to data corresponding to each image plane. The phase shift could also be applied randomly to each image plane for each print job to further reduce the visibility of the resulting pattern. The more regular a pattern, the easier it is to be picked up and noticed by the human vision system. Hence by applying a random phase shift to each plane, the patterns for the image planes will be less regular and harder to see.

The application of mask data to image data to produce a printed pattern may also be referred to as a method of interleaving to produce an interleave pattern. For clarity: a mask may be applied to an image; mask data corresponds to the mask in a similar way that image data corresponds to the image; mask data may be applied to image data; print data may refer to image data where no mask is applied, or to image data where mask data has been applied to the image data.

Complementary mask values for adjacent masks, as described in certain examples herein, results in an even pixel coverage due to the same number of ink drops being deposited at each pixel location for each image plane. The mask patterns described in certain examples herein, reduce the visibility of artifacts when a print medium is erroneously advanced by an amount larger than a desired amount such as for the height of a swath or print region, resulting in a gap between the swaths with a lower pixel coverage than the rest of the image. Likewise, said examples may also reduce artifacts in a case when a print medium is erroneously advanced by an amount less than the desired amount such as for the height of a swath or print region resulting in an over-printed region between the swaths with a higher pixel coverage than the rest of the image, e.g. a region with a darker printed section in comparison to a surrounding printed area. In certain described cases, a gradated border is included at the border of a swath. This serves to offset an advance error by 'blurring' the border of the adjacent swaths in the event of an advance error.

Certain described examples, reduce or avoid artifacts despite limitations of pen fire frequency and larger errors of a media advance system that may be possible at high media advance speeds. In these examples, a particular mask pattern is applied to image data corresponding to a part of the swath that may be known to be affected by print defects. The pattern may be employed at one or more edges of a print region or swath to break up the border between adjacent print regions and improve the printed image quality. The mask pattern has a mask variation in two dimensions, e.g. across the width and height of a swath.

In certain examples that use a color offset in a first direction across a width of a print medium, e.g. along a scan axis of a printhead, the advance error for all color planes falls within different zones, where the zone is the part of each print region susceptible to print defects arising from an advance error. This further reduces the visibility of banding artifacts in multi-color prints. These techniques may also be applied for at least one of, amongst other, overlapping areas in multi-dye printheads and in multi-pen print carriage layouts.

At least some aspects of the examples described herein with reference to the drawings may be implemented using computer processes operating in processing systems or processors. For example, these processing systems or processors may implement controller 225 of FIG. 2. These aspects may also be extended to computer programs, particularly computer programs on or in a carrier, adapted for putting the aspects into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

Similarly, it will be understood that any controller referred to herein may in practice be provided by a single chip or integrated circuit or plural chips or integrated circuits, optionally provided as a chipset, an application-specific integrated circuit (ASIC), field-programmable gate array (FPGA), etc. For example, this may apply to all or part of a controller 225 or other printer control circuitry. The chip or chips may comprise circuitry (as well as possibly firmware) for embodying at least a data processor or processors as described above, which are configurable so as to operate in accordance with the described examples. In this regard, the described examples may be implemented at least in part by computer software stored in (non-transitory) memory and executable by the processor, or by hardware, or by a combination of tangibly stored software and hardware (and tangibly stored firmware).

The preceding description has been presented only to illustrate and describe examples of the principles described. In certain examples herein reference to applying a mask may also correspond to applying a function that is equivalent to the application of a mask. For example a mask function may comprise a procedure that decides for every pixel in an overlap zone and for every printer pen or printhead whether a nozzle in said pen or printhead should fire or not. In the case of complementary masks this procedure may depend on whether the pixel forms part of the top or bottom of a swath. A masking function may use data defining all or part of a mask or submask. A masking function and/or data defining a mask may be pre-processed and/or supplied as part of controller firmware. The interleave function is code which creates two Interleave mask for the top and the bottom of the initial mask, and A masking function and/or data defining a mask may be applied to existing pre-processed masks at a time before printing of a swath. Data corresponding to a mask or submask may not be stored independent of a function, and the definition of the function represents a particular mask pattern. For example, there are known equations for triangular waves and these may be adapted to determine whether to turn on or off a particular nozzle based on supplied image data for an unmasked case, e.g. they may define nozzle activation in a two-dimensional plane corresponding to a portion of an image to be printed. Even though certain examples have presented an overlap zone from the perspective of a one pass print mode (P=1), an overlap zone for a multipass printmode (e.g. P=N where N>1) may be larger than that shown. For example, for 4 passes without interleaving the overlap would be three-quarters of the swath height. This description is not intended to be exhaustive or to limit these principles to any precise form disclosed. Many modifications and variations are possible in light of the above teaching.

What is claimed is:

1. A method comprising:
   receiving image data corresponding to at least a portion of an image, having a width in a first direction and a height in a second direction, to be printed, wherein the image data includes a first print region to be deposited on a first pass of at least one printhead of a plurality of printheads and a second print region to be deposited on a next pass of the at least one of the plurality of printheads subsequent to a relative movement of the at least installed one printhead and a print medium in the second direction the first print region and the second print region spatially overlapping in the second direction in an overlap zone;
   applying a first mask, including a first mask pattern, to image data corresponding to at least the overlap zone of the first print region, wherein the first mask pattern determines which pixels of a number of pixels in the overlap zone will be deposited by an end portion of the at least one printhead of a plurality of printheads on the first pass; and
   applying a second mask, including a second mask pattern, to image data corresponding to at least the overlap zone of the second print region, wherein the second mask pattern determines which pixels of a number of pixels in the overlap zone will be deposited by an opposing end portion of the at least one printhead of a plurality of printheads on a second pass,
   wherein each of the first and second mask patterns define a periodic variation in a dimension corresponding to the first direction,
   wherein the first and second mask patterns are arranged such that a superposition of the first print region and the second print region in the overlap zone corresponds to said portion of the image, and
   wherein first and second mask patterns corresponding to at least a second printhead are spatially separated in the dimension corresponding to the first direction in relation to first and second mask patterns corresponding to a first printhead.

2. The method of claim 1, wherein application of at least one of the first and second masks results in a periodic variation in print data values in a respective first and second print region in the first direction.

3. The method of claim 1, wherein the method comprises applying different interleave methods for each printhead, said different interleave methods representing a phase shift in the dimension corresponding to the first direction that is applied to each of the first and second mask patterns.

4. The method of claim 1, wherein each mask pattern has a first vector component arranged at a non-zero angle to an axis corresponding to the first direction and a second vector component also arranged at a non-zero angle to said axis.

5. The method of claim 3, wherein the different interleave methods are selected to maximize a spatial separation between image planes to be printed by each printhead.

6. The method of claim 2, wherein each of the first and second mask patterns comprise a waveform that is repeatable in the first direction.

7. The method of claim 6, wherein the waveform of the first and second mask patterns is based on at least one of a V-shaped pattern.

8. The method of claim 6, wherein an amplitude of the waveform is proportional to the height of the overlap zone in the second direction.

9. The method of claim 1, wherein the first and second mask patterns for each printhead vary in a dimension corresponding to the second direction.

10. The method of claim 1, wherein the first and second masks respectively comprise repeatable first and second submasks, and the first and second mask patterns respectively comprise repeatable first and second submask patterns.

11. The method of claim 10, wherein applying the first and second masks comprises applying a masking function.

12. The method of claim 1, wherein a scan axis of a printhead is defined parallel to the first direction and the first print region corresponds to a first swath extending in the first direction printed in a first pass of said printhead and the second print region corresponds to a second swath extending in the first direction printed in a second pass of said printhead.

13. The method of claim 1, wherein the first printhead is arranged to print a first color and the second printhead is arranged to print a second color.

14. The method of claim 1, wherein the printhead moves in the first direction and a media transport direction is in the second direction.

15. The method of claim 1, wherein applying one or more of the first and second masks comprises applying a gradated variation in pixel intensities at a border defined by the first and second mask patterns.

16. The method of claim 1, wherein each of the first and second mask patterns define a variation in a dimension corresponding to the second direction.

17. An apparatus comprising:
    a computing device interface for receiving image data corresponding to at least a portion of an image, having a width in a first direction and a height in a second direction, to be printed on a printing device, wherein the image data includes a first print region to be deposited on a first pass of at least one printhead of a plurality of printheads and a second print region to be deposited on a next pass of the at least one of the plurality of printheads subsequent to a relative movement of the at least one printhead and a print medium in the second direction, the first print region and the second print region spatially overlapping the second direction in an overlap zone;
    a controller to respectively apply a first mask function, including a first mask pattern, and a second mask function, including a second mask pattern, to image data corresponding to at least the overlap zone of the first and second print regions, wherein the first and second mask patterns determine whether a pixel in the overlap zone is deposited by an end portion of at least one printhead of the plurality of printheads on the first pass of the plurality of printheads or by opposing end portion of the at least one printhead of the plurality of printheads during the next pass of the plurality of printheads wherein each of the first and second mask patterns defining a periodic variation in a dimension corresponding to the first direction, wherein the first and second mask patterns are arranged such that a superposition of the first print region and the second print region in the overlap zone corresponds to said portion of the image and wherein the controller selects different mask functions for each of at least two printheads, first and second mask functions for at least a second printhead respectively implementing first and second mask patterns, said mask patterns being spatially separated in the dimension corresponding to the first direction in relation to first and second mask patterns for the first printhead.

18. The apparatus of claim 17, wherein the printing device receives the plurality of printheads in a carriage, the carriage being arranged to move along the first direction along a scan axis, and wherein a media transport direction is in the second direction.

19. The apparatus of claim 17, wherein the printing device is an inkjet printer.

20. The apparatus of claim 17, wherein the controller generates the first and second masks.

* * * * *

UNITED STATES PATENT AND TRADEMARK OFFICE
CERTIFICATE OF CORRECTION

PATENT NO. : 8,870,320 B2
APPLICATION NO. : 13/752527
DATED : October 28, 2014
INVENTOR(S) : Müller et al.

Page 1 of 1

It is certified that error appears in the above-identified patent and that said Letters Patent is hereby corrected as shown below:

In the Claims

In column 16, line 65, in Claim 17, delete "by" and insert -- by an --, therefor.

Signed and Sealed this
Second Day of June, 2015

Michelle K. Lee
*Director of the United States Patent and Trademark Office*